United States Patent [19]

Schlei

[11] 4,076,399
[45] Feb. 28, 1978

[54] CONTROL MECHANISM FOR A PLURALITY OF SLIDE PROJECTORS

[75] Inventor: Rudolf Schlei, Kronberg, Taunus, Germany

[73] Assignee: Braun Aktiengesellschaft, Frankfurt am Main, Germany

[21] Appl. No.: 605,581

[22] Filed: Aug. 18, 1975

[30] Foreign Application Priority Data

Aug. 16, 1974 Germany ............................ 2439182

[51] Int. Cl.$^2$ ............................................. G03B 21/26
[52] U.S. Cl. ......................................... 353/86; 353/94
[58] Field of Search ....................... 353/86, 83, 93, 94; 360/80, 79

[56] References Cited

U.S. PATENT DOCUMENTS

| | | | |
|---|---|---|---|
| 3,015,809 | 1/1962 | Myers ............................. | 340/166 C |
| 3,027,548 | 3/1962 | Vaughan ....................... | 340/166 CE |
| 3,282,155 | 11/1966 | Cleary ..................................... | 353/86 |
| 3,503,058 | 3/1970 | Ault ........................................ | 360/79 |
| 3,622,236 | 11/1971 | Novy ....................................... | 353/86 |
| 3,844,646 | 10/1974 | Oury ....................................... | 353/94 |
| 3,907,419 | 9/1975 | Moran ..................................... | 353/94 |
| 3,909,124 | 9/1975 | Schmidt ................................... | 353/94 |

*Primary Examiner*—Harry N. Haroian

*Attorney, Agent, or Firm*—Sughrue, Rothwell, Mion, Zinn and Macpeak

[57] ABSTRACT

A control system for the control of special functions in multiple projector systems is disclosed. The system can effect fading, blending and mixing at different speeds in forward and reverse projector directions. The system includes a freely programmable memory, such as a cross-bar distributor for storing program instructions. The program memory may be modified by changing the location of plug-in diodes at cross-over points between rows and columns of the cross-bar distributor. A selector is provided for extracting a portion of the programmed memory. The selector may include an automatic portion such as a stepping switch for changing the portion of the program selected. The selector provides binary coded signals representative of program instructions to a decoder. The decoder decodes the digital signals and provides control signals for effecting control of the light sources in each projector. The decoder includes a different charge-discharge circuit for each projector. The charge-discharge time constant of the control signal is changed to modify the rate of change of the actuation and deactuation of the projector. The decoder also includes means for changing the phase and amplitude of the control signal and means for supplying a slide changer pulse signal.

9 Claims, 7 Drawing Figures

CONTROL MECHANISM FOR A PLURALITY OF SLIDE PROJECTORS

FIELD OF THE INVENTION

The present invention relates to slide projector systems and, more particularly, to a control mechanism for controlling a multiple number of slide projectors, which mechanism is capable of carrying out special or supplementary functions such as fading or blending and mixing when in forward or reverse motion.

BACKGROUND OF THE INVENTION

In several applications of the use of slide projectors, such as during operational training of workers or in advertising, additional capabilities are desired which are not provided by conventional slide projectors. These capabilities or additional functions include fading or blending and mixing at several blending speeds, the projection of indicators (i.e., pointers), the projection of graphic arts upon another image, comparison projections, etc. Manual, mechanical or electrical controls can be provided for slide projectors in order to realize the special or supplementary functions.

A projection mechanism using two cartridge-or magazine-type projectors having a driven motor, a frame-change mechanism and a common control member is known, where, upon the switching off of one projector, th other one is set in motion (German patent application No. 1,572,714). In this projection mechanism, the control part contains a release member having electrical follow-on circuits, by means of which the bulbs of both projectors are alternately capable of being switched in and out. Also, when a bulb is switched out, a frame change is effected in the associated projector. Delay means are further associated with the follow-on circuits. By means of the delay means, the commencement of an image change is delayed at least by the bulb persistence following switch-off. A significant disadvantage of this mechanism is that fading, or blending and mixing is only possible during the forward run of the slide magazines or cartridges, so that the sequence of slides shown cannot be reversed.

In another control mechanism, it is possible to carry out fading or blending and mixing projections during forward and reverse motion (German Pat. No. 2,145,100). Here, the fading or mixing and blending proces is temporally pre- and post-coupled during respective forward and reverse motions to the cartridge or magazine transport. In this manner, the alternating switching of the projectors during forward and reverse motions of the magazines or cartridges is accomplished by respective first and second flip-flops with correspondingly associated switches.

The output signals of the first flip-flop, together with signals from a blending and mixing circuit control an AND gate. The cartridge or magazine transport circuits of the projectors are controlled via AND gates for respective forward and reverse motions. It is a disadvantage of these control circuits that they can basically only realize a mixing and blending projection.

It has also been suggested that digital control and permanent memory systems be utilized for the control and programming of large multi-projection systems (see E. Stechmesser: "Steuerung und Programmierung von grossen Multiprojektionsanlagen": Photo-technik und -wirschaft No. 1, 1974, s. 11). Large systems of this type are not, however, presently in use.

SUMMARY OF THE INVENTION

It is, accordingly, an object of the present invention to provide a mechanism for the control of at least two slide projectors, by means of which it is possible to offer a variety of special or supplemental functions such as fading, blending and mixing at different speeds, double projection and background projection.

It is also an object of the present invention to provide the control of a multiple number of slide projectors by the use of a programmable memory.

It is another object of the present invention to provide a mechanism for the control of a multiple number of slide projectors wherein a programmable memory is provided which is subject to being modified before and during projection operations and which may function for forward and reverse movement of the slide projector.

It is still another object of the present invention to provide means for automatically accessing information from a program memory for controlling a multiple number of slide projectors.

It is a further object of the present invention to provide means for controlling a multiple number of slide projectors wherein binary coded signals are derived from program memory for use in the creation of control voltages having selectable rise and fall times, amplitudes and phases, which control voltages are employed to acuate and deactuate the light source of respective projectors.

In accordance with the present invention, a control system is provided for at least two slide projectors wherein each projector has a light source subject to control by an electrical signal and comprises a freely programmable memory means. The memory means is capable of being programmed prior to and during operation of the projectors. The memory means is for storing program instructions for controlling the operation of the projectors. Selector means are included for selecting a predetermined portion of said stored program and for providing signals corresponding thereto. Decoding means which are responsive to signals received from the selector means are also included for decoding the signals and for providing functional control signals. The control signals are employed for controlling the activation and de-activation of respective projector light sources.

For a better understanding of the present invention, reference may be made to the following description and associated drawings while the scope of the invention will be pointed out in the appended claims.

DESCRIPTION OF THE INVENTION

Figure 1:
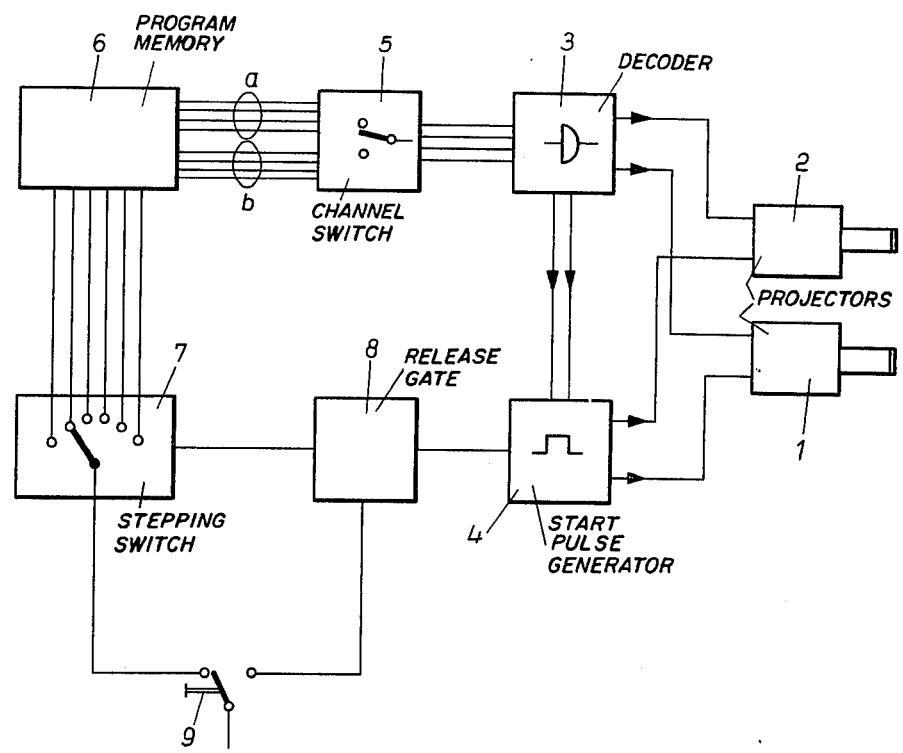
FIG. 1 illustrates an overall block diagram for the control of two slide projectors.

Referring initially to FIG. 1, a block circuit diagram of the projection control system of the present invention is shown. Elements 1 and 2 are slide projectors which have a light source subject to control by an electrical signal. Freely programmable memory means is shown as program memory 6. The program memory is capable of being programmed prior to and during operation of the projectors. The program memory stores program instructions for controlling the operation of the projectors. Selector means, shown as channel switch 5 and stepping switch 7, operate to select a predetermined portion of the stored program and to provide signals corresponding thereto. Decoding means, shown as decoding system 3, are responsive to the signals received from the selector means, decode the signals and provide functional control signals for controlling the activation and deactivation of the respective projector light sources. The stepping switch device 7 is additionally connected to a release gate 8 which, in turn, is connected to the start-plus generator 4. A manually operable switch 9 is connected both with the release gate 8 and the stepping switch device 7.

In operation, the system shown in FIG. 1 performs as follows: Upon actuation of the switch 9, the stepping switch device 7 is advanced one step. This results in the next program period being reached in the program memory 6, which releases signals representing a digitally coded program. This program can reach the decoding system via the four upper leads indicated as a or the four lower leads as indicated by b. The connection of the upper or lower connecting leads a or b is dependent upon the position of a channel switch 5, which is switchable between the two channels.

The decoding system 3 converts the digital instructions to control signals for the projectors 1 and 2. In addition, the decoding system converts the instructions to signals for the start pulse generator 4. Start pulse generator 4 provides appropriate slide change signals to the projectors 1 and 2. The output signals from the decoding system 3 to the projectors 1 and 2 are excitation voltages for the bulbs of the projectors.

Figures 2, 3:
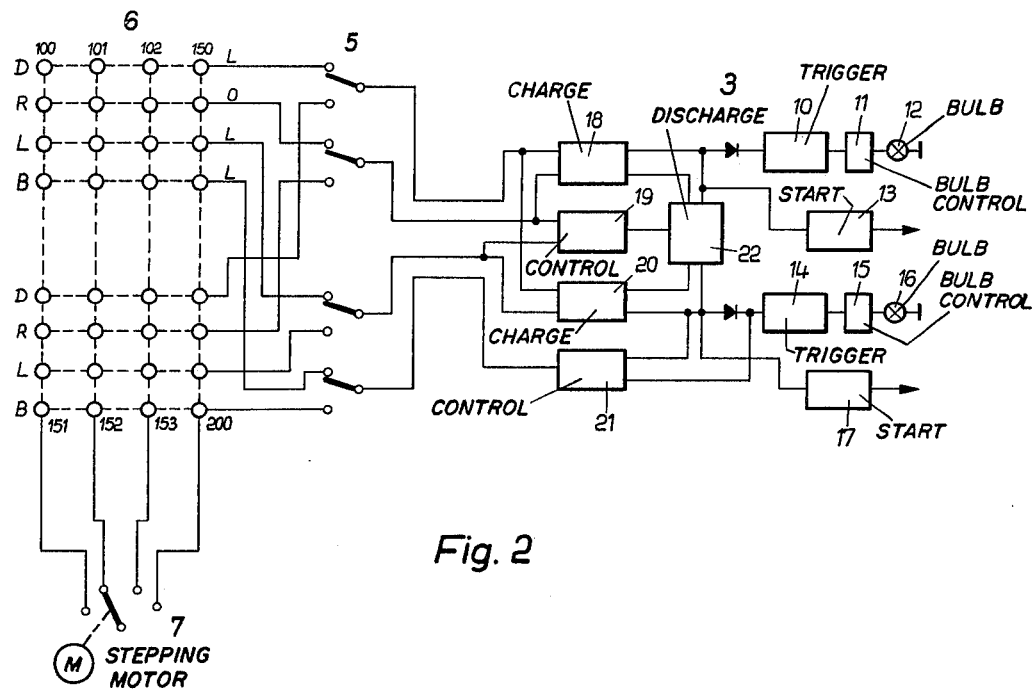
FIG. 2 shows a memory, a program selector and a decoding system in accordance with the block diagram of FIG. 1.
FIG. 3 is a detailed circuit and block diagram of the decoding system.

While different forms of the program memory 6 are possible, including magnetic memories, the preferred form is a cross-bar distributor as depicted in FIG. 2. FIG. 2 illustrates the memory 6, the channel switch 5, the stepping switch 7 and the decoder 3 in greater detail. The construction of program memory 6 as a cross-bar distributor has been divided into two half portions of space saving reasons. Thus, a cross-bar distributor of 100 program steps is preferably subdivided into two channels of 50 steps each. The upper half of the program memory includes rows D, R, L and B and columns 100 through 150. The lower half includes rows D, R, L and B and columns 151 through 200. After 50 steps, the channel switch switches to the lower half. The symbols D, R, L and B denote the functions "durations of blending and mixing", "right projector control", "left projector control", and "background projecting", respectively.

The row outputs of both halves of the memory are supplied to the channel switch 5, whose function - as has already been described - merely consists in switching from lines D, R, L and B of the upper half to lines D, R, L and B of the lower half of the cross-bar distributor 6 or vice-versa. Four connecting leads from the channel switch 5 are supplied to the decoding system 3, which in turn has four outputs. A trigger stage 10 is connected to the first of these outputs, which controls a bulb or light source 12 in the projector by way of a bulb control stage 11. The second output is connected to a start pulse generator 13. The third output controls a bulb 16 by way of a similar trigger state 14 and a bulb control stage 15. The fourth output is connected to a start pulse generator 17.

The decoding system 3 itself consists of a charging-circuit control 18 for the right projector, a control stage 19 for double projection, a charging-circuit control 20 for the left projector, a control circuit 21 for the background projection, and a discharge circuit 22 for rapid mixing and blending.

If it is now assumed that the channel switch 5 assumes the position shown in FIG. 2, then only the signals leaving the rows of the upper half of the cross-bar distributor 6 will reach the decoding system 3. The rows D, R, L and B and the columns controlled by the stepping switch form cross-over or bridging points. Depending on how the rows D, R, L and B of the columns controlled by the stepping switch device are either bridged or not bridged, a 1 or a 0 signal appears on the four leads coupled to the decoding system 3. Appropriate bridging elements are plug-in diodes (not shown). Certain functions can then be associated with particular digital combinations.

By means of a binary code using four digits (4 bits), $2^4 = 16$ different combinations of the signals 0 and 1, as is known, are obtainable. Of these 16 combinations in the system according to FIG. 2, only 12 combinations are used for control. Within those 12 combinations, there are further groupings. One grouping — for example, the blending and mixing projection — consists of the combinations, 0,0,1,0; 0,0,1,1; 0,1, 0,0; 0,1,0,1; while another grouping — for example the double projection — contains the combinations 0,0,0,0; 0,0,0,1; 0,1,1,0; 0,1,1,1. For the background projection, the combinations 1,0,0,0; 1,0,0,1; 1,0,1,0; and 1,0,1,1; can be provided. In particular, the orders denote the following:

0,1,0,1 = mixing and blending, right projector, slow
0,0,1,0 = mixing and blending, left projector, slow
0,1,0,1 = mixing and blending, right projector, fast etc.

By means of the upper row of the cross-bar distributor 6, which is denoted by "D", the rate of change by means of which the bulb brilliance is changed — and therefore also the rate of change of the program change — can be determined. If no plug-in diode is inserted at the appropriate cross-over point, this means that blending and mixing is accomplished slowly. If a plug-in diode is used at the cross-over point, then mixing and blending is accomplished quickly. This applies correspondingly also to the second line "R" = right projector. If a plug-in diode is inserted, then the bulb of the right projector is controlled so as to be dark. If, however, the plug-in diode is absent, then the bulb is controlled so as to be light. What is valid for the second row, applies, of course, also for the third row "L" = left projector, in a corresponding manner. With respect to the fourth row "B" (background), the following applies: if no plug-in diode is provided, the information of the third row is maintained; if a plug-in diode is used, then the information of the third row is ineffective, the slide of the left projector is not changed, and the bulb of the left projector is operated at a reduced brightness.

FIG. 3 illustrates in detail the individual constructions of the charging circuit control 18 for the right projector, the control stage 19 for double projection, the charging circuit control 20 for the left projector, the control circuit 21 for the background projection and the discharge circuit 22 for the quick blending and mixing. All of the above together form the decoding system 3.

The charging circuit control 18 for the right projector consists of two AND-gates U1 and U2, of two resistors R1 and R2, and of two diodes Di1 and Di2. The inputs of the AND-gate U1 are connected to the leads D and R form the cross-bar distributor 6, while the AND-gate U2 is only connected to the lead R. The output of the AND-gate U1, leads via the resistor R1 and the diode di1 to a capacitor C1, to which there is also connected the output of the AND-gate U2 via the resistance R2.

The capacitor C1 is connected via the diode Di2 to the trigger stage 10, which controls the bulb 12 via the bulb control stage 11. The AND-gate U1 serves for rapidly charging (the capacitor) C1, if a "1" signal is applied to the inputs D and R. The AND-gate U2, however, serves to slowly charge (the capacitor) C1, if a "1" signal is applied to the input R, as well as to slowly discharge (the capacitor) C2, when a "0" signal is applied to the input R.

The control stage 19 for double projection consists merely of a NAND gate NA1, which is connected with one input to the lead R and with its other input to the lead L. This stage blocks the discharge circuit 22 for quick blending and mixing, if a "1" signal is applied to the inputs R and L.

The charging circuit control 20 for the left projector is constructed in a manner similar to the charging circuit control 18. Also here two AND-gates U3 and U4, two resistors R5 and R6 and two diodes Di6 and Di3 are provided, which are connected in a manner corresponding to that of the charging circuit control 18.

One of the inputs of the AND-gage U3 is connected to the lead D, and its other input is connected to the lead L, while both inputs of the AND-gate U4 are connected to the lead L. The AND gate U3 serves to rapidly charge capacitor C2, if a "1" signal is applied to the inputs D. The AND gate U4, however, serves to slowly charge capacitor C2, if a "1" signal is applied to the input L, as well as to slowly discharge the capacitor C2, if a "0" signal is applied to the input L.

The control circuit 21 for the background projection consists of an inverter N1, two resistors R7 and R8, and two diodes Di7 and Di8. The input of the inverter N1, which is connected to ground via the resistance R8, is connected to the lead B. The output of the inverter N1 is connected via the resistor R7 and the diode Di7 to the start-pulse generator 17 and to capacitor C2. If a "1" signal is applied to the input B, then the inverter N1 serves to rapidly discharge the capacitor C2. The resistor R8 thus supplies a control voltage to the output of the capacititor C2.

The discharge circuit 22 includes two NAND gates NA2 and NA3, which are connected with one of their respective inputs to the output of the NAND gate NA1. The second input of the NAND-gate NA2 is connected to the output of the AND-gate U1, while the second input of the NAND gate NA2 is connected to the output of the AND-gate U3. A connection is established from the output of the NAND-gate NA2 to the input of the start-pulse generator 17 and the anode of the diode Di7 via a resistor R3 and a diode Di4. The output of the NAND gate NA3 is, however, connected via the resistor R4 and the diode Di5 with the anode of the diode Di2 and the capacitor C1. The NAND gate NA2 serves to rapidly discharge the capacitor C2, if a "1" signal is supplied by the outputs of the AND-gates U1 and NA1.

The NAND gate NA3 serves, however, for a rapid discharge of the capacitor C1, if a "1" signal is supplied by the outputs of the NAND gate NA1 and the AND gate U3.

The operation of the circuit, according to FIG. 3, is one of a plurality of switches operating in parallel, which appropriately switch the charge- or discharge time constants of the output circuits as a function of the control. The signals appearing on the leads D, R, L and B determine whether the gates U1, U2, NA1, U3, U4 and N1 are activated or not. The activated or non-activated gates determine the time constants of the respective output circuits.

Voltages due to the charging process appear on capacitors C1 and C2, which serve as control voltages to directly control the trigger stages 10 and/or 14. Hence the brightness of the respective projection bulbs 12 and 16 are controlled. The charging voltages are changed if the control signals on rows D, R. L and B are changed. The charging voltages increase or decrease in a sawtooth manner depending on the respective time constants.

Figure 4A:
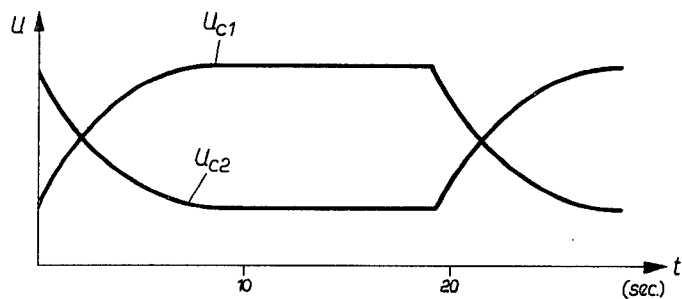
FIGS. 4a, 4b, 4c and 4d are voltage wave forms versus time of the control voltages applied to the projector bulbs or light sources.

FIGS. 4a–4d illustrates in further detail the variation of the control voltages appearing across capacitors C1 and C2. FIG. 4a shows the operation "slow blending and mixing". The voltages on capacitors C1 and C2 are oppositely phased but are proportional to one another. The voltage Uc1 increases, while the voltage Uc2 decreases, i.e., one projector bulb is controlled so as to become dark, and the other one so as to become bright. The rate of change of the sawtooth-shaped variation of the respective control voltages corresponds to the rate of change of blending and mixing.

Figure 4B:
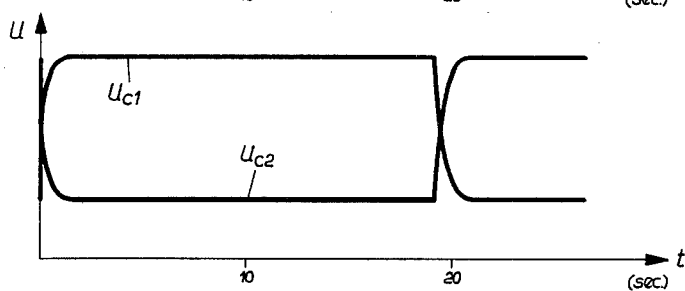

FIG. 4b illustrates the operation "fast blending and mixing". The difference between the voltage changes as compared to FIG. 4a is only due to the time constants being smaller (and the rates of change correspondingly being much faster).

Figure 4C:
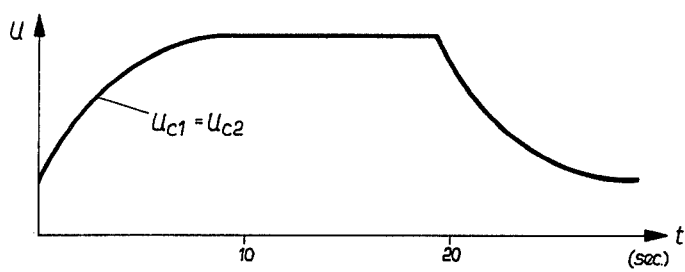

In the mode of operation "slow change", which is shown in FIG. 4c, the voltages Uc1 and Uc2 are proportional to each other and both voltages rise or fall in the same phase. The projectors are controlled so as to be simultaneously bright or dark.

Figure 4D:
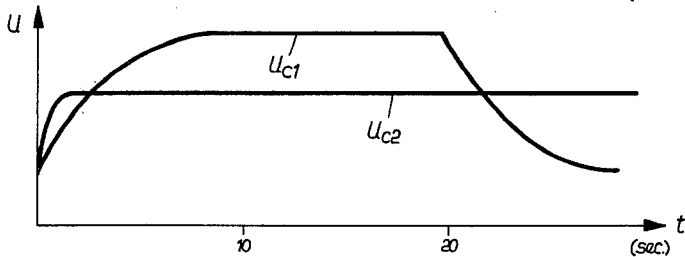

FIG. 4d shows the mode of operation "slow mixing in". Only the voltage Uc1 is changed as the program information changes. The projector 1 is controlled to be bright or dark, while the voltage Uc2 is kept at a constant medium voltage value, and the projector 2 projects accordingly at a medium brightness.

Various modifications may be made to the present invention. As mentioned above, a magnetic memory may be employed in lieu of the disclosed cross-bar distributor. In addition, a scale may be provided to indicate the status of the stored program within the program memory. That is, the location of the plug-in diodes at the cross-over points, or the absence of same, would be indicated. As previously stated, the starting pulses for the slide change are provided by the decoding means. In a preferred arrangement of the invention the starting pulses provided during the dark phase of the light source of the associated projector. Various other special effects may be controlled by the system of the present invention.

While the invention has been described and illustrated with respect to preferred embodiments which provide satisfactory results, it should be understood to those skilled in the art that various changes and modifications may be made therein without departing from the true spirit and scope of the present invention.

What is claimed is:

1. A control system for at least two slide projectors each projector having a light source subject to control by an electrical signal, said system comrpising:
   freely programmable memory means for storing program instructions for controlling the operation of the projectors, said memory means capable of being programmed prior to and during operation of said projectors, said memory means being a cross-bar distributor having columns and rows forming cross-over points, said cross-over points being connected by bridging means, a predetermined arrangement of bridged cross-over points forming a control program;
   selector means for selecting a predetermined portion of said control program and for providing signals corresponding thereto said selector means including a stepping switch device to automatically change the control program of said cross-bar distributor memory means, said device including an actuating key, a stepping motor and a stepping switch; and
   decoding means, responsive to signals provided by said selector means, for decoding said signals and for providing functional control signals for controlling the activation and deactivation of respective projector light sources.

2. A control system for at least two slide projectors each projector having a light source subject to control by an electrical signal, said system comprising:
   freely programmable memory means for storing program instruction for controlling the operation of the projectors, said memory means capable of being programmed prior to and during operation of said projectors, said memory means being a cross-bar distributor having columns and rows forming cross-over points, said cross-over points being connected by bridging means, a predetermined arrangement of bridged cross-over points forming a control program;
   selector means for selecting a predetermined portion of said control program and for providing signals corresponding thereto; and
   decoding means, responsive to signals provided by said selector means, for decoding said signals and for providing functional control signals for controlling the activation and deactivation of respective projector light sources said decoding means including means for providing different sawtooth voltages for activating and deactivating respective projector light sources, each of said sawtooth voltages having rise and fall times which are selectable by said selector means from the program of said memory means.

3. A system according to claim 2 wherein said selectable rise and fall times are provided by different charge and discharge circuits.

4. A control system for the control of special functions, including fading, blending and mixing at different speeds in multiple slide projector systems, said control being provided in forward and reverse operation of the projectors, said control system comprising:
   a programmable memory means for storing program instructions for controlling the operation of the projectors, the program instructions stored in said memory means being able to be modified at any time including the time during system operation, said memory means being a cross-bar distributor having columns and rows forming cross-over points, said cross-over points being connected by bridging means, a predetermined arrangement of bridged and unbridged cross-over points forming a control program;
   selector means for selecting a predetermined portion of said control program instructions and for providing signals corresponding thereto, said selector means including a stepping switch for automatically selecting different portions of said stored program instructions;
   decoding means, responsive to signals received from said selector means, for decoding said signals and for providing control signals having associated rise and fall times; and
   at least two slide projectors, responsive to respective control signals for said decoding means, each of which having a projection light source having its illumination subject to voltage control, wherein the rate of actuation and deactuation of the projectors is controlled by the rise and fall times of the control signals.

5. The control system of claim 4 wherein said selector means includes said stepping switch for selecting appropriate columns of said cross-bar distributor memory and another switch for selecting rows, the presence or absence of a bridging means at selected columns and rows forming a digital representation which is supplied in electrical signal form to said decoding means.

6. A control system for the control of special functions, including fading, blending and mixing at different speeds in multiple slide projector systems, said control being provided in forward reverse operation of the projectors, said control system comprising:
   a programmable memory means for storing program instructions for controlling the operation of the projectors, the program instructions stored in said memory means being able to be modified at any time including the time during system operation, said memory means being a cross-bar distributor having columns and rows forming cross-over points, said cross-over points being connected by bridging means, a predetermined arrangement of bridged and unbridged cross-over points forming a control program;
   selector means for selecting a predetermined portion of said control program instructions and for providing signals corresponding thereto;
   decoding means, responsive to signals received from said selector means, for decoding said signals and for providing control signals having associated rise and fall times, said control signals being control voltages and said decoding means including a charging-discharging circuit corresponding to each projector, the rate of charging and discharging of each circuit controlling the rise and fall time of a control voltage associated with said circuit which is supplied to a corresponding projector; and
   at least two slide projectors, responsive to respective control signals for said decoding means, each of which having a projection light source having its illumination subject to voltage control, wherein the rate of actuation and deactuation of the projectors is controlled by the rise and fall times of the control signals.

7. The control system of claim 6 wherein said decoding means also includes means for controlling the phase between the control voltages.

8. The control system of claim 6 wherein said decoding means also includes means for controlling the amplitude of the control voltages.

9. The control system of claim 6 wherein said decoding means also includes means for providing start pulses for effecting slide change, said control voltages having portions corresponding to light and dark phases of the projector light sources, said pulses being provided during the dark phase of the control voltage.

* * * * *